United States Patent [19]
Blicher

[11] Patent Number: 4,771,734
[45] Date of Patent: Sep. 20, 1988

[54] METHOD AND APPARATUS FOR FEEDING A PLURALITY OF UNTETHERED ANIMALS

[75] Inventor: Steen Blicher, Fåborg, Denmark

[73] Assignee: Biomat Inc., Chicago, Ill.

[21] Appl. No.: 892,769

[22] Filed: Jul. 31, 1986

Related U.S. Application Data

[63] Continuation of Ser. No. 764,861, Aug. 12, 1985, abandoned, which is a continuation of Ser. No. 671,792, Nov. 14, 1984, abandoned, which is a continuation of Ser. No. 455,055, Oct. 18, 1982, abandoned, which is a continuation of Ser. No. 177,452, Aug. 12, 1980, abandoned.

[30] Foreign Application Priority Data

Aug. 15, 1979 [DK] Denmark .............................. 3424/79
Jun. 4, 1980 [DK] Denmark .............................. 2439/80

[51] Int. Cl.$^4$ ............................................. A01K 5/02
[52] U.S. Cl. .................... 119/51.11; 119/51.5
[58] Field of Search ............... 119/51 R, 51.11, 51.13, 119/51.5, 56 R

[56] References Cited

U.S. PATENT DOCUMENTS

| | | | |
|---|---|---|---|
| 2,969,769 | 1/1961 | Paschall | 119/56 R |
| 3,157,157 | 11/1964 | Clay et al. | 119/51.11 |
| 3,498,311 | 3/1970 | Hawes, Jr. | 119/51.11 X |
| 3,556,057 | 1/1971 | Icking | 119/51.11 X |
| 3,800,746 | 4/1974 | Stidham | 119/56 R |
| 4,051,812 | 10/1977 | DeLoach et al. | 119/51.5 X |
| 4,182,273 | 1/1980 | Peterson | 119/51.5 |

FOREIGN PATENT DOCUMENTS 1037323 8/1978 Canada .............................. 119/51 R Primary Examiner—Robert P. Swiatek
Attorney, Agent, or Firm—Bryan, Cave, McPheeters & McRoberts

[57] ABSTRACT

The invention relates to a method and an apparatus for feeding a plurality of untethered animals at their respective feeding places in the same enclosure. During each feeding period portions of fodder each not exceeding a few mouthfuls and preferably not substantially exceeding one mouthful are supplied to each feeding place, and the portions are supplied at such time intervals that the rate of fodder supply to the feeding place substantially corresponds to the desired eating rate of each of the animals. Preferably a portion of dry fodder and a corresponding portion of liquid are supplied simultaneously to each feeding place. The portions of fodder are preferably supplied successively to the various feeding places, and the portions may be metered by a rotor arm having a free end extending radially through an annular slot communicating with a fodder reservoir.

32 Claims, 2 Drawing Sheets

METHOD AND APPARATUS FOR FEEDING A PLURALITY OF UNTETHERED ANIMALS

This is a continuation of U.S. application Ser. No. 764,861, filed Aug. 12, 1985 (now abandoned), which is a continuation of U.S. application Ser. No. 671,792, filed Nov. 14, 1984 (now abandoned), which is a continuation of U.S. application Ser. No. 435,055, filed Oct. 18, 1982 (now abandoned), which is a continuation of U.S. application Ser. No. 177,452, filed Aug. 12, 1980 (now abandoned).

BACKGROUND OF THE INVENTION

1. Field of the Invention

The present invention relates to a method and an apparatus for feeding a plurality of untethered animals at their respective feeding places in the same enclosure. The invention relates to feeding of animals in general, but more specifically it relates to feeding of pigs or hogs.

Normally, a number of untethered pigs or hogs of the same age are kept in the same enclosure or pigpen. It is well kown that when such animals are restrictively fed, great variations in the weights of the animals will occur so that the pigs or hogs do not become ready for delivery to the slaughterhouse at the same time. This is to some extent due to different hereditary characteristics, but it is predominantly due to the competition occurring during feeding of the animals, because the more aggressive and quick-eating of the pigs in the enclosure consume a greater amount of fodder than the less aggressive and more slowly eating pigs. This phenomenon means that the individual animal does not get the intended amount of fodder which has been calculated on the basis of the weight of the animal, and, consequently, the utilization of the fodder will not be optimum. Also the utilization of the piggery is adversely influenced, because the more slowly eating pigs or hogs in the pigpen are using more than the stipulated normal time for reaching the slaughter weight, and in the prolonged period of growth they will eat more fodder than necessary. It is true that the quick-eating pigs will reach the slaughter weight in a period of time which is shorter than the stipulated normal time, but nevertheless they will consume a total amount of fodder exceeding the stipulated normal amount.

As the digestive organs of pigs or hogs are comparable with those of the human beings, it is assumed that for pigs as well as for human beings it is unhealthy and inconvenient to overeat. Feeding by means of the conventional feeding apparatuses, rewarding the quick-eating pigs or hogs by supplying more fodder to them than to the more slowly eating pigs, causes an "eating competition".

Thus, the present invention provides a method of feeding a plurality of untethered animals at their respective feeding places in the same enclosure, said method comprising supplying during a feeding period to each of said feeding places portions of fodder, each portion not exceeding a few mouthfuls, at such time intervals that the rate of fodder supply to each of said feeding places substantially corresponds to the desired eating rate of each of said animals. The time intervals between the supply of succeeding portions of fodder to each feeding place may then be chosen so that the animals will have good time to chew and swallow the fodder. On the other hand, the time intervals between the supply of succeeding fodder portions may not be made so long that the animals become impatient and are tempted to change feeding place. It has been found that the feeding of pigs or hogs by supplying small portions to the eating places in accordance with the method of the invention has an advantageous psychological effect on the animals. Apparently, the animals become so engaged in following the feeding rhythm that they forget about the neighbouring pigs and about their own normal aggressiveness. The supply of fodder in portions also makes it possible to obtain a more accurate and uniform supply of fodder to the individual feeding places than when fodder is supplied continuously. Thus, in the most simple form the metering of the portions may take place by means of a metering cup, a metering chamber or the like.

According to the invention the time intervals between the supply of succeeding fodder portions to the same feeding place may be varied within the same feeding period, whereby it is possible to control the eating rhythm of the pigs or hogs in a desired manner. For example, the time intervals may be made longer during the last part of the feeding period than during the first part thereof when the pigs are still hungry and more impatient. The time intervals may, of course, also be varied from one feeding period to another, and the various feeding periods may be made longer or shorter as desired.

Also the amount of fodder in each of the portions supplied may be changed within certain limits. It has been found that the above mentioned psychological effect is not obtained if each portion contains such an amount of fodder that it takes relatively short time for the pig to eat the same. On the other hand each portion should preferably contain an amount of fodder sufficient to satisfy the animal for a while. According to the invention each portion of fodder does not substantially exceed one mouthful.

The method according to the invention may be used in connection with any type of fodder suitable to be metered in portions. Thus, a suitable amount of liquid may be added to the fodder before metering thereof. However, in such case the fodder tends to stick to wall parts with which it comes into contact. Therefore, it is normally preferred to use dry fodder, and in that case a suitable liquid portion may be supplied to each feeding place for each portion of dry fodder. Because the liquid is supplied in portions, and not continuously, the correct relative amounts of dry fodder and liquid will immediately be present at each feeding place. The amount of liquid supplied may be made by mixing two or more different liquids immediately before supplying them to the feeding places. If, for example, the liquids are water and a protein containing liquid, the blending proportion may be controlled so as to accurately control the supply of protein liquid in accordance with the varying need of the animals.

The feeding places may be in the form of adjacent troughs or trough sections which may, for example, be arranged along a circle or a line. In principle, the portions of fodder may be supplied to the various feeding places simultaneously or in a predetermined order of succession. In practice, the fodder portions may advantageously be supplied to the various feeding places by means of a rotor passing a number of ducts or passages each communicating with a respective one of the feeding places. Thus, when the rotor rotates, portions of fodder are successively supplied to the various feeding places. If the rotor rotates with a substantially constant rotational speed, the portions of fodder may be supplied to the individual feeding places with substantial uniform time intervals, which may, however, be changed, if desired, by changing the rotational speed of the rotor and/or the length of a possible stop or interval between succeeding revolutions of the rotor. As mentioned above, dry fodder and liquid may be supplied separately to each feeding place. The dry fodder may then, for example, contain all the fodder components necessary for the desired growth of the animals, and the liquid may then be water. Alternatively, the dry fodder may be carbohydrate fodder, and the liquids may be a standard nutritive liquid and water, respectively.

The invention also relates to an apparatus for feeding animals at their respective feeding places, said apparatus comprising a fodder reservoir and metering and supply means for metering from said reservoir portions of fodder not exceeding a few mouthfuls, and for supplying during a feeding period of each of said feeding places a plurality of said metered portions of fodder at desired time intervals.

BRIEF DESCRIPTION OF THE DRAWINGS

The invention will now be further described with reference to the drawings, wherein.

DESCRIPTION OF THE PREFERRED EMBODIMENT

Figure 1:
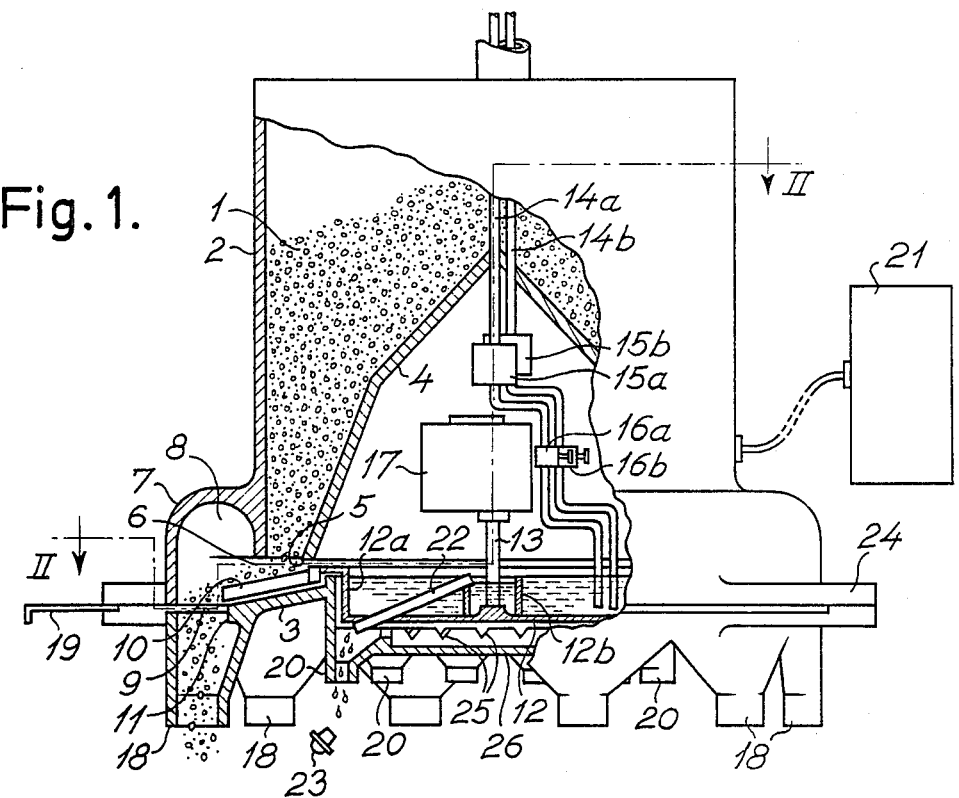
FIG. 1 is a side view and partially sectional view of an embodiment of the feeding apparatus according to the invention.
Figure 2:
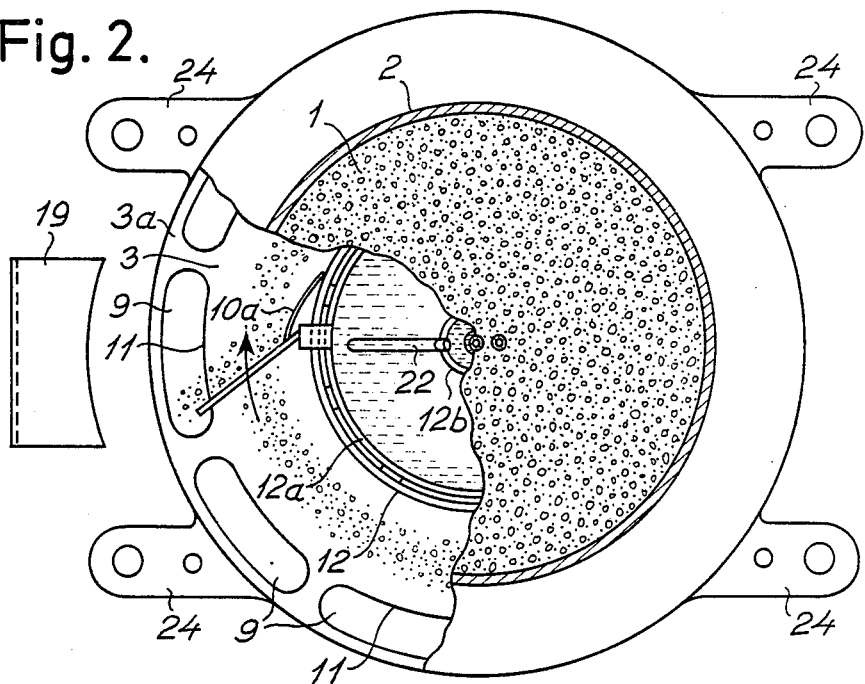
FIG. 2 is a sectional view along the line II—II in FIG. 1, and FIGS. 3-6 are perspective views diagrammatically illustrating various feeding arrangements including the apparatus according to the invention.

In the feeding apparatus shown in FIGS. 1 and 2 dry fodder 1 is arranged in a cylindrical fodder reservoir or container 2 having an annular, conical bottom plate 3, which may, alternatively, have another upwardly arched or a plane shape. A hollow distributing cone 4 is arranged centrally within the container 2 so that a lower edge portion 5 of the cone is positioned above and in closely spaced relationship with the bottom plate 3. The cylindrical wall of the fodder container 2 has a lower edge portion 6 which is also positioned above and spaced from the bottom plate 3 so as to define an annular space or slot between the edge portion 6 and the bottom plate 3. The radial distance between the distributing cone 4 and the inner cylindrical wall of the container 2 is sufficient to allow fodder 1 to fall down into the annular space defined between the cone and the container wall under the influence of its own weight, when fodder is removed through the space defined between the bottom plate 3 and the lower edge portion 6 of the cylindrical wall of the container 2. However, the size of the last mentioned space is selected so small that fodder 1 does not flow out through this space exclusively under the influence of the weight of the fodder contained within the container 2, and the space defined between the bottom plate 3 and the lower edge portion 5 of the distributing cone 4 is still smaller. If desired, the said spaces may be adjustable by insertion or removal of spacer members, not shown. The cylindrical wall of the fodder container or reservoir 2 has a lower skirt portion 7 with an increased diameter defining together with the outer rim portion 3a of the bottom plate 3 an annular chamber 8. This chamber 8 communicates with the inner space of the container 2 through the slot or space defined between the bottom plate 3 and the lower edge portion 6 of the container wall. As shown in FIG. 2 a number of identical, uniformly spaced openings 9 are formed in the rim portion 3a of the bottom plate 3 in a circular arrangement.

The feeding apparatus shown in FIGS. 1 and 2 also comprises a rotor mounted rotatably about the vertical axis of the fodder reservoir or container 2. This rotor includes a rotor arm 10 extending between the bottom plate 3 and the lower edges 5 and 6 to a radial position adjacent to the inner edge 11 of the openings 9. The rotor arm 10 may be rotated in the direction indicated by an arrow in FIG. 2 and may be directed backwards as shown. A fodder deflecting wire or finger 10a having one end mounted on the front side of the rotor arm extends forwardly in the rotational direction of the rotor and radially inwardly as shown in FIG. 2 so as to prevent fodder from being pushed radially inwardly below the cone 4.

The rotor of the feeding apparatus also comprises an upwardly open liquid distributing container 12 to which the inner end of the rotor arm 10 is fastened. The distributing container 12 comprises an outer cylindrical wall 12a and an inner cylindrical wall 12b arranged concentrically with said outer wall and with the rotor axis. The vertical height of the cylindrical wall 2b is slightly smaller than that of the outer cylindrical wall 12a, and a liquid outlet 22 in the form of an overflow passage extends radially outwardly and downwardly from the upper edge portion of the inner cylindrical wall 12b as best shown in FIG. 1. Liquid may be supplied to the annular container space defined between the cylindrical walls 12a and 12b through a pair of liquid supply tubes 14a and 14b provided with valves 15a, 16a and 15b, 16b, respectively, which may be manually or automatically controlled. The rotor comprising the liquid distributing container 12 and the rotor arm 10 is rotated by means of an electric motor 17 which is connected to the distributing container by means of a shaft 13, and which may be controlled in a manner which will be explained more in detail below.

A funnel-shaped fodder supply duct 18 is arranged immediately below each of the openings 9 in the bottom plate 3, and the lower end of these fodder supply ducts are connected to respective ones of a number of trough sections or other forms of separated feeding places, by means of tubes or passages, not shown in FIGS. 1 and 2. These trough sections may be arranged annularly or in line as shown in FIGS. 3-6. A number of funnel-shaped liquid supply ducts 20 corresponding to the number of fodder supply ducts 18 are positioned in a circular arrangement substantially concentrically with the circular arrangement of the ducts 18, and the liquid supply ducts 20 are also connected to the respective feeding places by means of suitable tubes or passages (not shown).

Closing plates 19 may removably be inserted in the space between any of the fodder supply ducts 18 and the lower edge of the skirt 7, whereby the fodder supply duct in question may be closed. The corresponding liquid supply duct 20 may be closed by means of a removable stopper 23 or by blocking the liquid passage extending between the feeding apparatus and the respective feeding place in any other manner. The lower ends of the liquid supply tubes 14a and 14b extend downwardly into the upwardly open part of the rotatable liquid distributing container 12 defined between the cylindrical walls 12a and 12b. When different liquids, for example water and protein liquid, respectively, are supplied to this part of the container 12, rotation of the container causes mixing of the liquids. When the liquid reaches the level of the upper edge of the cylindrical wall 12b, liquid will flow into the central part of the container and then eventually leave the container 12 through the liquid outlet 22. A second upwardly open, stationary container 26 is formed by a central bottom portion of the apparatus. The inner parts of the funnel-shaped liquid supply ducts 20 communicate with this second container via V-shaped notches 25 in the upper edge portions of the ducts. If one or more of the liquid supply ducts 20 are closed, liquid will flow into the stationary container 26 through the associated notch 25, and when the stationary container has been filled, the liquid will flow out through the remaining V-shaped notches 25 and distribute into the other liquid supply ducts 20 which are open.

The skirt portion 7 is provided with outwardly extending ears or mounting members 24 provided with holes for screws or bolts for installation of the apparatus.

The apparatus described above operates as follows:

When the motor 17 has been started it rotates the rotor arm 10 and the liquid distributing container 12 together with the liquid outlet 22 at a suitable rotational speed. Simultaneously, supply of liquid through one or both of the liquid supply tubes 14a and 14b is started by means of the valves 15a, 16a and 15b, 16b. Rotation of the arm 10 causes a small portion of fodder resting on the bottom plate 3 to be pushed radially outwardly beyond the edge 11 and down through the opening 9 being passed by the rotor arm, so that fodder portions continue to fall down through the associated fodder supply duct 18 and down to the associated feeding place. The liquid outlet 22 extends in the same radial direction as the rotor arm 10. Therefore, when a fodder portion is supplied to a feeding place through the associated fodder supply duct 18, a portion of liquid flows through the liquid outlet 22 and one of the liquid supply ducts 20 down to the same feeding place. It is understood that rotation of the rotor causes successive supply of fodder and liquid to the various feeding places, and that dry fodder and liquid will be supplied to the feeding places simultaneously. If the number of animals or pigs to be fed corresponds to the number of feeding places or fodder supply ducts 18 all of the fodder and liquid supply ducts must be open. If, however, the number of animals to be fed is smaller than the number of feeding places, one or more of the feeding supply ducts 18 should be closed by means of the closing plate 19, while the corresponding liquid duct or ducts 20 may be closed by means of the stoppers 23 or the like as explained above, so that neither dry fodder nor liquid will be supplied to the feeding place or places not being used.

The portion of dry fodder being supplied to individual feeding places for each revolution of the rotor arm 10 is mainly determined by the following:
(a) The mutual radial spacing between the lower edges 5 and 6, the vertical spacings between the bottom plate 3 and each of these lower edges, and the possible slope of the bottom plate 3.
(b) The consistency of the dry fodder (powder or pellets).
(c) The shape of the rotor arm 10.
(d) The rotational speed of the rotor arm.

The total amount of fodder supplied to each feeding place during a feeding period depends inter alia on the duration of the feeding period, the rotational speed of the rotor arm, and the total number of revolutions of the rotor during the feeding period.

Among the factors mentioned above the length of the feeding period, the rotational speed of the rotor arm, and the number of revolutions per feeding period may be chosen as variables, while the other factors may be kept constant. The operation period of the motor 17 and, consequently, the duration of the feeding period may, for example, be controlled by means of an electrical time switch, so that—other things being equal—the total amount of fodder supplied to the feeding places will be proportional to the duration or length of the feeding period. The number of revolutions of the rotor arm per feeding period may be regulated by controlling the motor so that the motor is stopped during a small time period after each revolution. The operating and stopping periods of the motor may, for example, be controlled by means of a conventional electronic recycler.

The amount of liquid supplied to the tubes 14a and 14b and, consequently, the amount of liquid supplied to the individual feeding places may be controlled by means of the valves 15a, 15b, 16a, and 16b. One of the valves on each liquid tube, for example the valves 16a and 16b, may be a flow restricting valve which may, for example, be adjusted so that each feeding place receives an amount of liquid being 2½ times the amount of dry fodder supplied thereto, and the valves 15a and 15b may be closing valves which are controlled by the electrical control circuit of the motor 17 in such a manner that liquid supplied through the tubes 14a and 14b is stopped and started together with the motor.

The function of the motor 17 and of the valves 15a, 15b, 16a and 16b may, alternatively, be controlled by an electronic circuit 21 which may be programmed so as to change the length of the feeding period, the length of the time intervals between supply of successive fodder portions to the same feeding place, the total amount of fodder supplied, and/or the composition of fodder in accordance with a predetermined feeding schedule being in accordance with the needs of the animals. Such feeding program normally involves changes of the number of feeding periods per 24 hours, of the total amount of fodder per feeding period, of the relationship between wet fodder and liquid (the proportion of the metered amount of a standard nutritive liquid and the metered amount of water), and of the length of each feeding period as the weight of the animals increases. Thus, the ratio of the amounts of liquids supplied through the tubes 14a and 14b may be controlled as desired by controlling the flow restriction valves 16a and 16b, and the electronic control circuit may be programmed so that the supply of liquid to the tubes 14a and 14b and, consequently, the mutual mixing ratio may be regulated so as to obtain the ratio which according to tests has been found to cause an optimum growth of the animals. If desired, the electrical control circuit may be used for controlling several feeding apparatuses and adapted to automatically control the fodder supply during the total growth period of the animals. As an example, the control circuit may include an Intelligent Programmable Control System as that marketed by Texas Instruments Inc. under the designations "TI 550" for controlling the operation of a great number of feeding apparatuses. The control circuit may also be adapted to indicate prior to each feeding period the total amount of fodder to be used during that period in the feeding apparatus or apparatuses controlled by the circuit.

Figure 3:
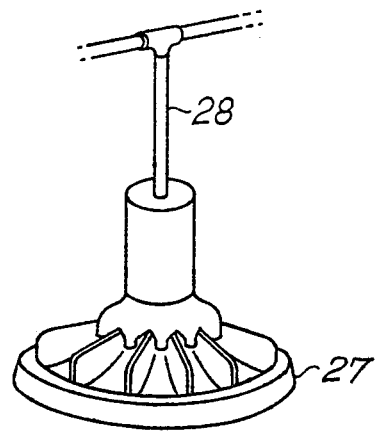
Figure 4:
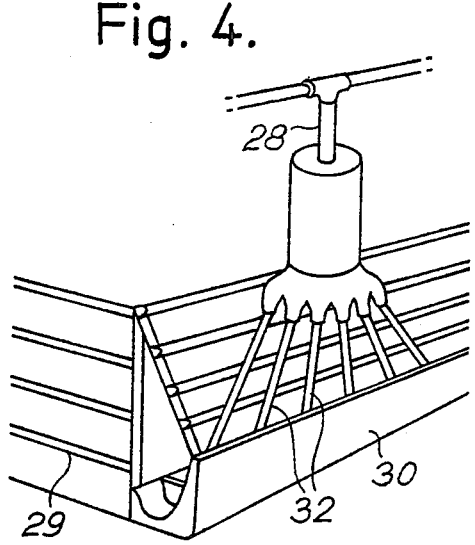
Figure 5:
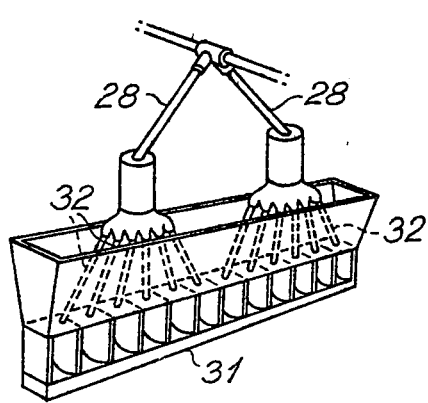
Figure 6:
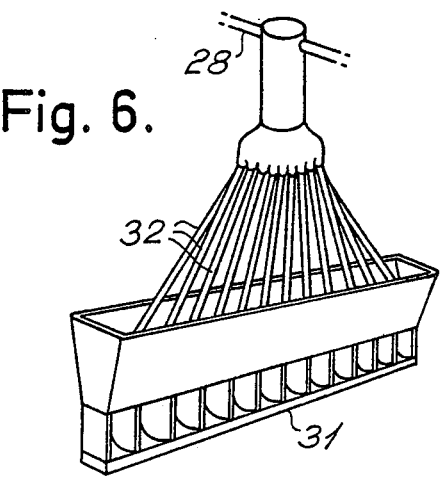

The feeding apparatus shown in FIGS. 1 and 2 may be used in connection with any suitable trough shape, wherein adjacent feeding places are preferably separated by a partition wall. FIG. 3 shows an annular trough 27 having a feeding apparatus positioned immediately above and coaxially with the trough, and dry fodder and liquid are supplied directly into the trough section by means of the supply ducts 18 and 20. FIG. 4 shows a conventional pigpen 29 provided with a linear trough 30 which is divided into individual feeding places, while FIGS. 5 and 6 show another type of a linear trough 31. In FIG. 5 two feeding apparatuses are arranged above a single trough, and in FIG. 6 a single feeding apparatus is used. In the arrangements shown in FIGS. 4-6 the feeding apparatuses are positioned at such a level above the trough that the fodder supply ducts 18 may be connected to the individual trough sections by means of suitable fodder supply tubes 32, so that the slope of the supply tubes 32 does not deviate too much from the vertical position, preferably not more than 45°. The liquid supply ducts 20 of the feeding apparatuses are connected to the respective trough section in a similar manner by means of suitable tubes or ducts, not shown.

EXAMPLE

A feeding apparatus as that shown in FIGS. 1 and 2 may be adapted to supply fodder to ten feeding places. The radial, horizontal distance between the edges 5 and 6 may then be about 20 mm, and the vertical distance between the lower edge portion 6 of the cylindrical wall of the fodder reservoir or container 2 and the bottom plate 3 may be about 10 mm. The circular inner edges 11 of the openings 9 may have a radius of about 155 mm. When pigs or hogs with an average weight of about 50 kg are fed, each feeding period may, for example, have a duration of about 15 minutes, and the dry fodder may be coarsely ground barley. For each revolution of the rotor arm 10 about 13 g dry fodder will then be supplied to each feeding place. If the motor 17 rotates with a rotational speed of 9 rpm. and if the motor is stopped for a period of about 4 seconds after each revolution, a total amount of about 0.7 kg dry fodder will be supplied to each feeding place during a feeding period. By means of the valves 16a and 16b the liquid supply may be controlled so that an amount of liquid being 2.5 times the weight of the dry fodder portion, is supplied to each feeding place. Water and a liquid fodder supplement are supplied through the tubes 14a and 14b, respectively, and the valves 16a and 16b are adjusted so that these liquids are supplied in the ratio 1:2.

Said liquid fodder supplement may be a standard protein liquid, and during the growth period of the animals the fodder mixture may be changed by changing the supplied amounts of the liquid protein supplement, the dry fodder or ground barley, and of the water, respectively. The said liquid protein supplement may, for example, consist of 30 parts of a meat-and-bone meal soup and 70 parts of blood which in a mixed condition contains 20 percent dry matter. When young pigs are fed, a mixture consisting of 50 percent by weight of the said liquid fodder supplement, 15 percent water and 35 percent coarsely ground barley may be used.

It should be understood that various modifications and amendments of the embodiment shown in the drawings may be made within the scope of the present invention. Thus, for example, the dry fodder metering means may have the form of a rotating sluicing device by means of which a predetermined volume of dry fodder may be sluiced from the fodder reservoir to each of the fodder supply ducts. It is also possible to arrange the fodder supply ducts along a line, and predetermined portions of dry fodder may then successively be supplied thereto by means of reciprocating fodder metering means. If all of the fodder components are in liquid form the feeding apparatus need only comprise metering means corresponding to the those designated by 12, 14-17 and 20. Furthermore, the valves 15a, 15b, 16a and 16b may be arranged outside the apparatus. Finally, liquid supply may take place by means of conventional liquid supply valves arranged at each individual feeding place.

What is claimed is:

1. A method of simultaneously feeding a plurality of untethered animals at their respective feeding places in the same enclosure, the feeding places being freely accessible to all of the animals in the enclosure, said method comprising supplying during a feeding substantially the same amount of fodder to all of said feeding places in portions of fodder; the portions of fodder being supplied to each feeding place at time intervals substantially corresponding to the desired eating rate of said animals; the portions of fodder and the time intervals between the supply thereof being substantially the same for all of the feeding places, and each portion of fodder that is supplied not exceeding a few mouthfuls, to thereby condition the animals so that slower and faster eating animals follow the same feed rhythm and the more aggressive animals are less aggessive than normal.

2. The method according to claim 1, wherein said animals are pigs or hogs.

3. The method according to claim 2, wherein the duration of time intervals is changed during the same feeding period.

4. The method according to claim 3, wherein the time intervals are longer during the last part of the feeding period than during the first part of the feeding period.

5. The method according to claim 2, wherein each of said portions does not substantially exceed one mouthful.

6. The method according to claim 2, wherein said fodder is dry fodder, a suitable liquid portion being supplied to each feeding place for each portion of dry fodder.

7. The method acccording to claim 6, wherein said liquid is prepared by mixing at least two different liquids prior to supplying said mixed liquid to said feeding places.

8. The method according to claim 6, wherein said portions of dry fodder and liquid are supplied to each feeding place in relative amounts so as to constitute a fodder mixture containing all the fodder components necessary for desired growth of said animals.

9. The method according to claim 2, wherein said portions of fodder are supplied successively to the various feeding places.

10. A method of simultaneously feeding a plurality of pigs or hogs at their respective feeding places in the same enclosure, said feeding places being freely accessible to all of the pigs or hogs in the enclosure, said method comprising supplying during a feeding period substantially the same amount of fodder to all of said feeding places in portions of fodder; the portions of fodder being supplied to each feeding place at substantially uniform time intervals substantially corresponding to the desired eating rate of said pigs or hogs; the portions of fodder and the time intervals between the supplies thereof being substantially the same for all of the feeding places, and each portion of fodder that is supplied not exceeding a few mouthfuls, to thereby condition the animals so that slower and faster eating animals follow the same feed rhythm and the more aggressive animals are less aggressive than normal.

11. The method according to claim 10, wherein said fodder is dry fodder, a suitable liquid portion being supplied to each feeding place for each portion of dry fodder.

12. The method according to claim 11, wherein said liquid is prepared by mixing at least two different liquids prior to supplying said mixed liquid to said feeding places.

13. The method according to claim 11, wherein said portions of fodder are supplied successively to the various feeding places.

14. A feeding arrangement for simultaneously feeding a plurality of untethered animals to thereby condition the animals so that slower and faster eating animals follow the same feed rhythm and the more aggressive animals are less aggressive than normal, said arrangement comprising
    an enclosure for housing said plurality of animals so that they may move freely around therein,
    a plurality of separate feeding places arranged in said enclosure, wherein each feeding place is freely accessible to all of the animals in the enclosure,
    a fodder reservoir,
    metering and supply means for metering and supplying from said reservoir to each of said feeding places successive metered fodder portions each not exceeding a few mouthfuls, the metering and supply means supplying substantially the same portions of fodder to all of the feeding places,
    driving means for driving the metering and supply means, and
    electronic control means for controlling the driving means to supply said successive metered fodder portions at predetermined time intervals corresponding to a desired eating rate of the animals, for supplying substantially the same total amount of fodder to all of the feeding places during a feeding period in which the driving means are operating.

15. A feeding arrangement according to claim 14, wherein said reservoir is a dry fodder reservoir, said arrangement further comprising liquid metering and supply means for supplying a metered amount of liquid to each of said feeding places each time a fodder portion is supplied thereto by said fodder metering and supply means.

16. A feeding arrangement according to claim 15, wherein said fodder metering and supply means further comprises a plurality of fodder supply passages each extending from a position below said annular slot to a lower position immediately above a respective one of said feeding places.

17. A feeding arrangement according to claim 16, further comprising means for selectively closing any of said fodder supply passages.

18. A feeding arrangement according to claim 15, wherein said liquid metering and supply means further comprises at least two liquid inlet tubes for supplying different liquids to said container.

19. A feeding arrangement according to claim 14, wherein said fodder metering and supply means comprises means defining an annular slot positioned below and communicating with said fodder reservoir, and a rotor arm having a free end extending radially through said slot.

20. A feeding arrangement according to claim 14, wherein the electronic control means controls operational characteristics of the arrangement selected from the group consisting of
    (a) the number of portions supplied to each of said feeding places during each of said feeding periods,
    (b) the amount of fodder in each of said portions,
    (c) the number of feeding periods per 24 hours, and
    (d) the composition of the fodder supplied to each of the feeding places.

21. A feeding arrangement according to claim 14, wherein said control means are adapted to change the duration of said time intervals during the same feeding period.

22. A feeding arrangement for simultaneously feeding a plurality of untethered pigs or hogs to thereby condition the animals so that slower and faster eating animals follow the same feed rhythm and the more aggressive animals are less aggressive than normal, said arrangement comprising
    an enclosure for housing said plurality of pigs or hogs so that they may move freely around therein,
    a dry fodder reservoir,
    fodder metering and supply means for metering and supplying from said reservoir to each of said feeding places successive metered dry fodder portions each not exceeding a few mouthfuls, the fodder metering and supply means supplying substantially the same portions of fodder to all of the feeding places,
    liquid metering and supply means for supplying a metered amount of liquid to each of said feeding places each time a dry fodder portion is supplied thereto by said fodder metering and supply means,
    driving means for driving said fodder and liquid metering and supply means, and
    electronic control means for controlling the driving means to supply said successive metered dry fodder portions at predetermined time intervals corresponding to a desired eating rate of the pigs or hogs, for supplying substantially the same total amount of fodder to all of the feeding places during a feeding period in which the driving means are operating.

23. A feeding arrangement according to claim 22, wherein said liquid metering and supply means comprises a liquid container mounted rotatably about a substantially vertical axis, said container having a liquid outlet radially spaced from said axis, and a pluraity of liquid supply passages each associated with a respective one of said feeding places, said liquid supply passages having open upper ends juxtaposed in a circular arrangement about said axis, said liquid outlet being directed towards said circular arrangement of upper ends.

24. A feeding arrangement according to claim 23, wherein said liquid outlet is an overflow passage.

25. A feeding arrangement according to claim 23, further comprising means for selectively closing any of said liquid supply passages.

26. A feeding arrangement according to claim 22, wherein said liquid metering and supply means comprises a liquid container mounted rotatably about a substantially vertical axis, said container having a liquid outlet and a plurality of liquid supply passages each associated with a respective one of said feeding places, said liquid supply passages having open upper ends juxtaposed in a circular arrangement about said axis, said liquid outlet being directed towards said circular arrangement of upper ends.

27. A feeding arrangement according to claim 26, wherein said fodder metering and supply means comprises means defining an annular slot positioned below and communicating with said dry fodder reservoir, and a rotor arm having a free end extending radially through said slot and being rotatable together with said liquid container.

28. A feeding arrangement according to claim 27, wherein said fodder metering and supply means further comprises a plurality of fodder supply passages each extending from a position below said annular slot to a lower position immediately above a respective one of said feeding places.

29. A feeding arrangement according to claim 26, wherein said liquid metering and supply means further comprises at least two liquid inlet tubes for supplying different liquids to said container.

30. A feeding arrangement according to claim 26, wherein said liquid outlet is an overflow passage.

31. A feeding arrangement according to claim 22, wherein the electronic control means controls operational characteristics of the arrangement selected from the group consisting of
 (a) the number of portions supplied to each of said feeding places during each of said feeding periods,
 (b) the amount of fodder in each of said portions,
 (c) the number of feeding periods per 24 hours, and
 (d) the composition of the fodder supplied to each of the feeding places.

32. A feeding arrangement according to claim 31, wherein the duration of said time intervals are slightly varied during the same feeding period.

* * * * *